United States Patent
Mol et al.

(10) Patent No.: US 7,685,890 B2
(45) Date of Patent: Mar. 30, 2010

(54) BEARING ASSEMBLY WITH A STRAIN SENSOR

(75) Inventors: Henk Mol, Sleeuwijk (NL); Erik Zaaijer, Nieuwegein (NL); Fabio Falsetti, Turin (IT); Carl Vissers, Den Dungen (NL)

(73) Assignee: AB SKF, Gothenburg (DE)

( * ) Notice: Subject to any disclaimer, the term of this patent is extended or adjusted under 35 U.S.C. 154(b) by 0 days.

(21) Appl. No.: 12/090,085

(22) PCT Filed: Oct. 11, 2006

(86) PCT No.: PCT/NL2006/050255

§ 371 (c)(1),
(2), (4) Date: Sep. 4, 2008

(87) PCT Pub. No.: WO2007/043885

PCT Pub. Date: Apr. 19, 2007

(65) Prior Publication Data

US 2009/0000399 A1 Jan. 1, 2009

(30) Foreign Application Priority Data

Oct. 12, 2005 (NL) .................................. 1030181

(51) Int. Cl.
*G01L 3/14* (2006.01)
(52) U.S. Cl. ................................. 73/862.322
(58) Field of Classification Search ............. 73/862.322
See application file for complete search history.

(56) References Cited

U.S. PATENT DOCUMENTS

| 1,769,374 | A | * | 7/1930 | Kutter ........................ 384/205 |
| 4,168,160 | A | | 9/1979 | Stoferle et al. |
| 4,768,389 | A | * | 9/1988 | Chszaniecki ............. 73/862.49 |
| 5,230,569 | A | * | 7/1993 | Sheedy ........................ 384/276 |
| 5,743,016 | A | * | 4/1998 | Manne et al. .......... 29/898.062 |
| 5,905,212 | A | | 5/1999 | Moses et al. |
| 2002/0012484 | A1 | | 1/2002 | Salou et al. |
| 2002/0057856 | A1 | | 5/2002 | Bailey et al. |

FOREIGN PATENT DOCUMENTS

DE 102 50 340 (A1) 5/2004

OTHER PUBLICATIONS

Form PCT/ISA/210 (International Search Report) dated Feb. 6, 2007.
Form PCT/ISA/237 (Written Opinion of the International Searching Authority) dated Feb. 6, 2007.

\* cited by examiner

*Primary Examiner*—Lisa M Caputo
*Assistant Examiner*—Octavia Davis
(74) *Attorney, Agent, or Firm*—Buchanan Ingersoll & Rooney PC

(57) ABSTRACT

A bearing and shaft assembly comprises a shaft and at least one bearing, and is provided with at least one strain sensor. An elastic component is provided between the shaft and the at least one bearing, and the elastic component comprises the at least one strain sensor. In one disclosed embodiment, the elastic component forms an integral part with one of the bearing and the shaft.

15 Claims, 1 Drawing Sheet

BEARING ASSEMBLY WITH A STRAIN SENSOR

TECHNICAL FIELD

The invention relates to a bearing and shaft assembly, comprising a shaft and at least one bearing, and provided with at least one strain sensor.

BACKGROUND

Strain sensors are used to measure load. The signal from the strain sensor is then processed to represent a load value. Load measuring in a bearing is known e.g. from DE 102 50 340, where a load measuring bearing comprises strain gauges that are mounted as a thick film on one of the bearing rings. The bearing ring is formed with a slot in which during heat treatment of the ring the thick film with the strain gauge is burned.

Such an arrangement has the disadvantage that the bearing ring needs to be a stiff element to properly support the rolling elements, with as little misalignment of the rolling elements under load as possible. Because of this stiffness of the bearing rings the resolution of the strain-gauges is very limited. As a result only forces that act in the weakest direction of the bearing ring are measurable.

SUMMARY OF THE INVENTION

It is an aim of the invention to provide a bearing and shaft assembly with at least one strain sensor for a bearing and shaft arrangement that has an improved resolution as compared to arrangements of the state of the art, thus allowing an improved measurement of forces also forces that act in different directions.

This aim is reached by providing according to the invention of a bearing and shaft assembly comprising a shaft and at least one bearing, and provided with at least one strain sensor, wherein an elastic component is provided between the shaft and the at least one bearing and that the elastic component comprises the at least one strain sensor. The elastic component will flex as a result of the forces that are transmitted e.g. by the bearing to the elastic component. This flexing as a result of the elasticity of the component gives a higher resolution to the strain sensor that is comprised with the elastic component. Clearly, the elasticity of the elastic component will at least in one direction be greater than the elasticity of the bearing ring. The elastic component can be given a shape such that the elasticity conforms to the direction of the forces that need to be measured.

In a preferred embodiment of the invention the elastic component forms an integral part with either the bearing or the shaft. This simplifies the mounting of the assembly.

In an especially preferred embodiment of the invention the elastic component comprises a sleeve, mounted on the shaft which at least at one end comprises an internal step forming an overhung part over the shaft, the bearing being mounted on the outside, in radial direction, of the overhung part of the sleeve and the inside comprising the at least one strain sensor. In this arrangement especially the radial loads on the bearing, as well as all moments that are acting on the bearing will give a good response of the elastic component and hence of the strain sensor. Thus these loads can easily be measured with very good resolution.

For many applications it is of advantage to have a bearing and shaft arrangement where two bearings are mounted on the shaft. Here, in a preferred embodiment of the invention the arrangement comprises two bearings, that both are mounted on the elastic component wherein the elastic component comprises at least one strain sensor for each bearing. Such a bearing and shaft assembly has the ability to measure the complete load spectrum on the arrangement with an even better resolution.

Preferred embodiments of the invention can especially be tailored for the application. Applications for which a bearing and shaft arrangement, with capability to measure load, according to the invention is of particular interest, are two wheelers, trucks, cars and conveyors.

In yet another preferred embodiment of the invention, the strain sensor is positioned inside the bearing bore. This enables the strain sensor in addition to loads acting on the bearing, to register rolling element passing. From this it is possible to derive the rotational speed of the bearing. Thus in addition to measuring load, the device according to the invention also measures rotational speed.

For applications where the rotational speed is not interesting as a measurement parameter, a preferred embodiment of the invention has the strain sensor positioned outside the bearing bore. E.g. at the position where the elastic component flexes most.

BRIEF DESCRIPTION OF THE FIGURE

An example of a preferred embodiment of the invention will now be described also referring to the drawing, in which.

DETAILED DESCRIPTION

Figure 1:
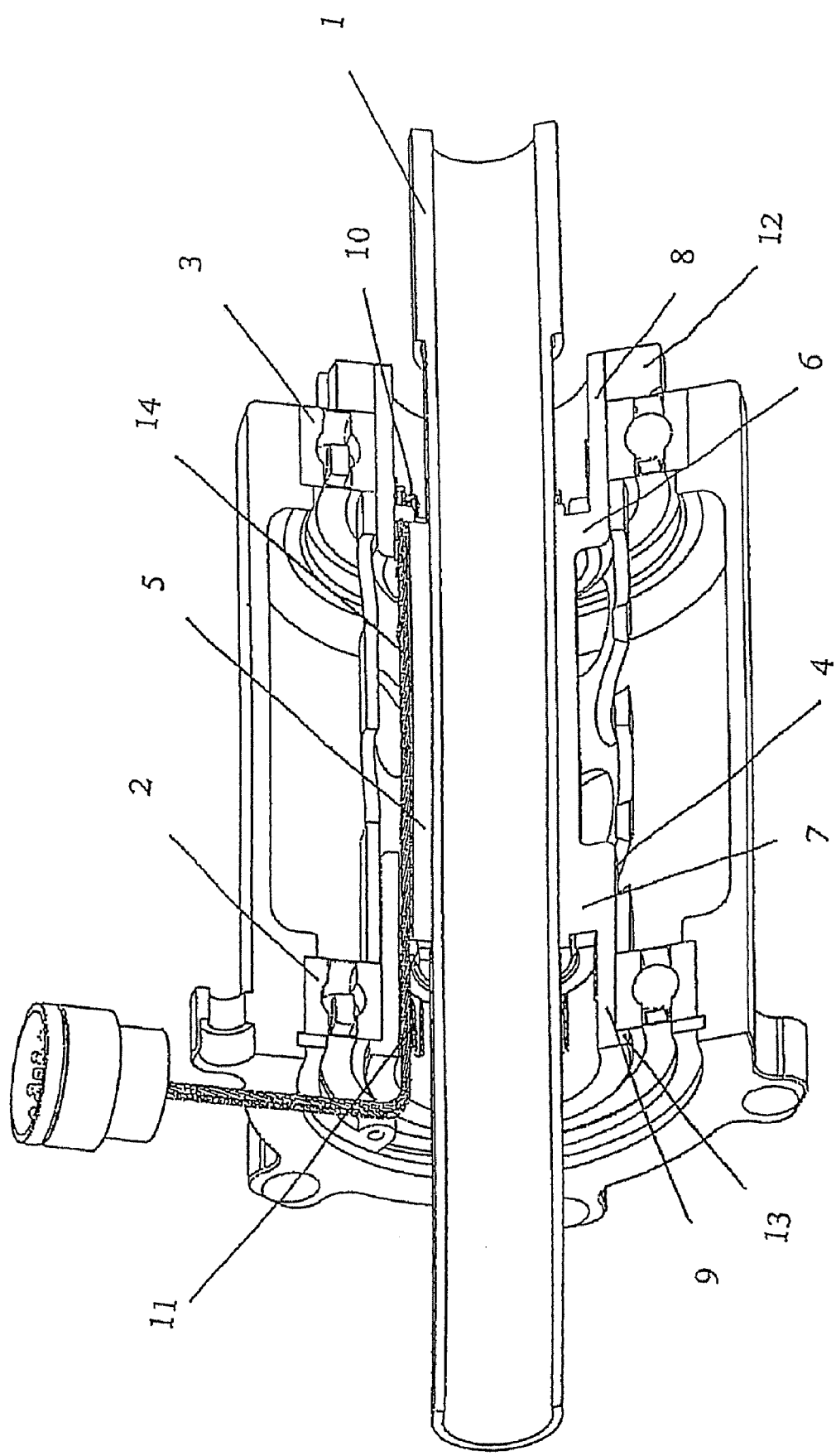
FIG. 1 shows in axial cross section a bearing and shaft assembly according to the invention, with two ball bearings.

In FIG. 1 a shaft 1 is shown, and two bearings 2, 3 are mounted on a elastic component 4, which in turn is mounted on shaft 1. The bearing and shaft assembly forms part of a wheel of a motor cycle.

Elastic component 4 comprises a middle section 5 that is in direct contact with shaft 1. At each of the opposing ends of middle section 5, elastic component 4 is formed with steps 6, 7, and further extending outward in axial direction respectively overhung parts 8, 9. Bearings 2, 3 are mounted on respectively overhung parts 9, 8 of elastic component 4.

Elastic component 4 comprises at the overhung parts 8, 9, at the inside in radial direction, strain sensor assemblies 10, 11 respectively. Strain sensor assemblies 10, 11 each comprise three separate strain sensors, suitably positioned on the inner circumference of respectively overhung parts 8, 9 of elastic component 4. This arrangement enables measurements, not only of vertical load on the motor cycle wheel, but at the same time loading components such as acceleration/deceleration forces as well as cornering forces can be determined. This makes this bearing and shaft assembly very versatile and useful.

At the opposing ends in axial direction, elastic component 4 comprises flanges 12, 13 respectively. Flanges 12, 13 form locating abutments for respectively bearings 3, 2.

In this cross section also can be seen that the elastic component comprises a cable groove for accommodating sensor cable 14. Because in this application the bearing outer rings are rotating, the sensors are stationary and thus there is no need for devices to transfer data from rotating parts to a stationary part, such as data coupling devices.

However, the bearing and shaft assembly according to the invention is equally well applicable to rotating inner rings. In such a case the signal has to transferred from the rotating part to a stationary part. This can be done by any known technique.

Many changes and modifications can be made to the above-described embodiment of the invention, without departing from the scope of the invention such as defined in the attached claims.

The invention claimed is:

1. Bearing and shaft assembly, comprising a shaft and at least one bearing, and provided with at least one strain sensor, wherein an elastic component is provided between the shaft and the at least one bearing and wherein the elastic component comprises the at least one strain sensor and a sleeve mounted on the shaft, which at least at one end comprises an internal step forming an overhung part over the shaft, the bearing being mounted on outside, in a radial direction, of the overhung part of the sleeve and the inside comprising the at least one strain sensor.

2. Bearing and shaft assembly according to claim 1, wherein the elastic component forms an integral part with one of: the bearing and the shaft.

3. Bearing and shaft assembly according to claim 1, further comprising two bearings that both are mounted on the elastic component, and wherein the elastic component comprises at least one strain sensor for each bearing.

4. Bearing and shaft assembly according to claim 3, wherein the bearing and shaft assembly is a wheel bearing arrangement for a two wheeler.

5. Bearing and shaft assembly according to claim 3, wherein the bearing and shaft assembly is a wheel bearing arrangement for a truck.

6. Bearing and shaft assembly according to claim 3, wherein the bearing and shaft assembly is a wheel bearing arrangement for a car.

7. Bearing and shaft assembly according to claim 3, wherein the bearing and shaft assembly is an arrangement for a conveyor.

8. Bearing and shaft assembly according to claim 1, wherein the strain sensor is positioned inside a bearing bore.

9. Bearing and shaft assembly according to claim 1, wherein the strain sensor is positioned outside a bearing bore.

10. Bearing and shaft assembly according to claim 1, wherein the bearing and shaft assembly is a wheel bearing arrangement comprising a part of a two wheeler.

11. Bearing and shaft assembly according to claim 1, wherein the bearing and shaft assembly is a wheel bearing arrangement comprising part of a truck.

12. Bearing and shaft assembly according to claim 1, wherein the bearing and shaft assembly is a wheel bearing arrangement comprising part of a car.

13. Bearing and shaft assembly according to claim 1, wherein the bearing and shaft assembly is an arrangement comprising part of a conveyor.

14. Bearing and shaft assembly according to claim 2, further comprising two bearings both mounted on the elastic component, and wherein the elastic component comprises at least one strain sensor for each bearing.

15. Bearing and shaft assembly according to claim 1, further comprising two bearings both mounted on the elastic component, and wherein the elastic component comprises at least one strain sensor for each bearing.

* * * * *